United States Patent
Le Barny et al.

(10) Patent No.: US 10,056,197 B2
(45) Date of Patent: Aug. 21, 2018

(54) ELECTRODE-GEL ELECTROLYTE ASSEMBLY COMPRISING A POROUS CARBON MATERIAL AND OBTAINED BY RADICAL POLYMERISATION

(71) Applicant: THALES, Courbevoie (FR)

(72) Inventors: Pierre Le Barny, Palaiseau (FR);
Laurent Divay, Palaiseau (FR);
Christophe Galindo, Palaiseau (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/783,988

(22) PCT Filed: Apr. 8, 2014

(86) PCT No.: PCT/EP2014/057062
§ 371 (c)(1),
(2) Date: Jan. 13, 2016

(87) PCT Pub. No.: WO2014/166952
PCT Pub. Date: Oct. 16, 2014

(65) Prior Publication Data
US 2016/0189881 A1    Jun. 30, 2016

(30) Foreign Application Priority Data

Apr. 10, 2013   (FR) ..................... 13 00828

(51) Int. Cl.
*H01G 11/32*  (2013.01)
*H01G 11/56*  (2013.01)
*H01G 11/40*  (2013.01)

(52) U.S. Cl.
CPC ............. *H01G 11/32* (2013.01); *H01G 11/40* (2013.01); *H01G 11/56* (2013.01); *Y02E 60/13* (2013.01)

(58) Field of Classification Search
CPC ...... H01G 9/00; H01G 9/0029; H01G 9/0032; H01G 9/0036; H01G 9/022; H01G 9/04; H01G 9/07
See application file for complete search history.

(56) References Cited

U.S. PATENT DOCUMENTS 6,205,016 B1    3/2001  Niu
2003/0185741 A1  10/2003  Matyjaszewski
(Continued)

FOREIGN PATENT DOCUMENTS

JP    H02-30071 A    1/1990
JP    H09-45590 A    2/1997
(Continued)

OTHER PUBLICATIONS

A. Lewandowski et al., "New composite solid electrolytes based on a polymer and ionic liquids," Solid State Ionics, vol. 169, pp. 21-24, (2004).
(Continued)

*Primary Examiner* — Seahvosh Nikmanesh
(74) *Attorney, Agent, or Firm* — Baker & Hostetler LLP

(57) ABSTRACT

A process for producing an electrode-gel electrolyte assembly based on porous carbonaceous material comprising radical-trapping sites comprises: a step of forming a bond between the radical-trapping sites of the carbonaceous material and functionalizing molecules, a step of preparing a solution comprising at least one monofunctional monomer and at least one polyfunctional monomer, an ionically conductive electrolyte and a radical initiator, a step of impregnating the solution of the monomers into the pores of the carbonaceous material, and a step of in situ radical polymerization of the monomers.

8 Claims, 3 Drawing Sheets

(56) References Cited

U.S. PATENT DOCUMENTS

2004/0071624 A1     4/2004    Tour et al.
2012/0295149 A1   11/2012   Xie

FOREIGN PATENT DOCUMENTS

| JP | 2007-305453 A | 11/2007 |
|---|---|---|
| WO | 01/57895 A1 | 8/2001 |
| WO | 2012/035217 A1 | 3/2012 |
| WO | 2012/129532 A1 | 9/2012 |

OTHER PUBLICATIONS

Y. Zhang et al., "Carbon nanotube-zinc oxide electrode and gel polymer electrolyte for electrochemical supercapacitors," Journal of Alloys and Compounds, vol. 480, pp. L17-L19, (2009).

M. Selva Kumar et al., "LiClO4-Doped Plasticized Chitosan as Biodegradable Polymer Gel Electrolyte for Supercapacitors," Journal of Applied Polymer Science, vol. 114, pp. 2445-2454, (2009).

A. Noda et al., "Highly conductive polymer electrolytes prepared by in situ polymerization of vinyl monomers in room temperature molten salts," Electrochimica Acta, vol. 45, pp. 1265-1270, (2000).

A. B. H. Susan et al., "Ion Gels Prepared by in Situ Radical Polymerization of Vinyl Monomers in an Ionic Liquid and their Characterization as Polymer Electrolytes," Journal of American Chemcial Society, vol. 127, pp. 4976-4983, (2005).

Yiyong He et al., "Ion Gels by Self-Assembly of a Triblock Copolymer in an Ionic Liquid," Journal of Physical Chemistry B, vol. 111, pp. 4645-4652, (2007).

Keun Hyung Lee et al., "Electrical Impedance of Spin-Coatable Ion Gel Films," Journal of Physical Chemistry B, vol. 115, pp. 3315-3321, (2011).

Keun Hyung Lee et al., "'Cut and Stick' Rubbery Ion Gels as High Capacitance Gate Dielectrics," Advanced Materials, vol. 24, pp. 4457-4462, (2012).

J.M. Ko et al., "Capacitive performance of the composite electrodes consisted of polyaniline and activated carbons powder in a solid-like acid gel electrolyte," Electrochimica Acta, vol. 50, pp. 873-876, (2004).

M. Klingshim et al., "Gelation of Ionic Liquids Using a Cross-Linked Poly(Ethylene Glycol) Gel Matrix," Chemical Materials, vol. 16, pp. 3091-3097, (2004).

Kozo Matsumoto et al., "Confinement of Ionic Liquid by Networked Polymers Based on Multifunctional Epoxy Resins," Macromolecules, vol. 41, pp. 6981-6986, (2008).

R. Uchiyama et al., "Development of dry polymer electrolyte based on polyethylene oxide with co-bridging agent corsslinked by electron beam," Solid State Ionics, vol. 180, pp. 205-211, (2009).

Da Qin et al., "Ionic liquid/polymer composite electrolytes by in situ photopolymerization and their application in dye-sensitized solar cells," Electrochimica Acta, vol. 56, pp. 8680-8687, (2011).

Ming Li et al., "Study on Properties of Gel Polymer Electrolytes Based on Ionic Liquid and Amine-Terminated Butadiene-Acrylonitrile Copolymer Chemically Crosslinked by Polyhedral Oligomeric Silsesquioxane," Journal of Applied Polymer Science, vol. 126, pp. 273-279, (2012).

B. Ganesh et al., "Acrylamide based proton conducting polymer gel electrolyte for electric double layer capacitors," Ionics, vol. 14 pp. 339-434, (2008).

Devatha P. Nair et al., "Two-Stage Reactive Polymer Network Forming Systems," Adv. Funct. Materials, vol. 22, pp. 1502-1510, (2012).

Pierre Le Barny et al., "Covalently functionalized single-walled carbon nanotubes and graphene composite electrodes for pseudocapacitor application," Proceedings of SPIE vol. 8814, Sep. 24, 2013, XP055097426.

ELECTRODE-GEL ELECTROLYTE ASSEMBLY COMPRISING A POROUS CARBON MATERIAL AND OBTAINED BY RADICAL POLYMERISATION

CROSS-REFERENCE TO RELATED APPLICATIONS

This application is a National Stage of International patent application PCT/EP2014/057062, filed on Apr. 8, 2014, which claims priority to foreign French patent application No. FR 1300828, filed on Apr. 10, 2013, the disclosures of which are incorporated by reference in their entirety.

FIELD OF THE INVENTION

The invention relates to components for energy storage such as supercapacitors. The invention relates more particularly to the passivation of porous carbon-based electrodes for the purpose of producing supercapacitors having a gelled polymer electrolyte obtained via a radical process.

BACKGROUND

A supercapacitor or electrochemical capacitor is a capacitor of particular technology that makes it possible to obtain power and energy densities that are intermediate between batteries and conventional electrolytic capacitors. Most supercapacitors comprise two porous electrodes impregnated with electrolyte and separated by an insulating and porous membrane that allows the circulation of the ions contained in the electrolyte.

The basic principle of supercapacitors rests upon the capacitive properties of the interface between the electrodes which are solid electronic conductors and the electrolyte which is a liquid ionic conductor. Energy storage takes place by the distribution of the ions of the electrolyte in the vicinity of the surface of each electrode, under the influence of the potential difference applied between the two electrodes. A space charge region, also known as an electrochemical double layer, having a thickness limited to a few nanometers is thus created at the interfaces. The supercapacitors therefore have full capacitances. The energy storage is in fact of electrostatic origin and not of electrochemical origin as in the case of storage batteries, which gives them a potentially high specific power.

Conventionally, supercapacitors use activated carbon as electrode material. Research is being carried out to develop electrodes based on CNTs, the acronym for carbon nanotubes. Carbon nanotubes have an electrical conductivity of the order of 100 $S \cdot cm^{-1}$, greater than the electrical conductivity of activated carbon which is of the order of 1 $S \cdot cm^{-1}$. Carbon nanotubes are easy to process; they do not require the use of binder, for example. Furthermore, the use of sheets of carbon nanotubes, more commonly known under the name "buckypaper", makes it possible to envisage the production of flexible supercapacitors owing to the mechanical cohesion of the carbon nanotubes to one another in a buckypaper.

Customarily, the electrolytes used are based on the use of a quaternary ammonium salt, such as tetraethylammonium tetrafluoroborate, dissolved in an organic solvent, typically acetonitrile or propylene carbonate, which potentially has significant risks of leakage of the solvent in the case of damaging the supercapacitor.

An improvement that makes it possible to prevent the risks of leakage consists in producing all-solid supercapacitors, or, in other words, supercapacitors comprising a solid electrolyte, i.e. supercapacitors comprising an electrolyte which does not flow.

Several routes are being explored in order to obtain a solid electrolyte:

One route consists in producing a polymer electrolyte. A polymer electrolyte is understood to mean: a polymer that can dissolve a salt or an ionic liquid or a polymer synthesized in an ionic liquid.

This first route makes it possible to combine properties of ionic conductivity with a polymer.

Here are several examples of polymer electrolytes obtained by dissolving a salt or an ionic liquid in a polymer:

mixture of polyacrylonitrile or polyethyleneoxide or polyvinyl alcohol with an ionic liquid, "A. Lewandowski, A. Swiderska, *Solid State Ionics*, 169 21-24, (2004)", mixture of polyvinyl alcohol with a phosphomolybdic acid, "Y. Zhang, X. Sun, L. Pan, H. Li, Z. Sun, C. Sun, B. K. Tay, *J. of Alloys and Compounds*, 480, L17-L19, (2009)", mixture of polyvinyl alcohol or sulfonated polyether ether ketone with a lithium salt, "M. S. Kumar, D. K. Bhat, *J. of Applied Polymer Science*, 114, 2445-2454, (2009)".

Here are several examples of polymer electrolytes obtained by radical polymerization of a monofunctional monomer in solution in an ionic liquid:

methyl methacrylate or acrylonitrile or vinyl acetate or styrene or 2-hydroxyethyl methacrylate (HEMA) polymerized in solution in 1-ethyl-3-methylimidazolium tetrafluoroborate or in 1-butylpyridinium, "A. Noda, M. Watanabe, *Electrochimica Acta* 45. 1265-1270, (2000)", methyl methacrylate or acrylonitrile or vinyl acetate or styrene or 2-hydroxyethyl methacrylate (HEMA) or methyl acrylate or acrylamide polymerized in solution in 1-ethyl-3-methylimidazolium bis(trifluoromethanesulfonyl)imide (EMITFSI), "M. A. B. H. Susan, T. Kaneko, A. Noda, and M. Watanabe, *J. AM. CHEM. SOC.*, 127, 4976-4983, (2005)".

Another route consists in using polymers bearing ionic functions, mainly of ionic liquid type such as the polymers of FIGS. 1a to 1d, for which the charge is borne by the side chains of the macromolecule:

(a) poly(1-vinyl-3-ethylimidazolium) salt, (b) poly(1-(6-(acryloyloxy)hexyl)-3-ethylimidazolium salt, (c) ionic liquid polymer with a side chain, derived from a methacrylate and bearing a 3-ethylimidazolium group as cation, (d) ionic liquid polymer with a side chain, functionalized by a trifluoromethane sulfonimide anion and having 1,3-ethylmethylimidazolium as counter ion.

FIG. 2 represents a polymer, obtained by self-assembly of a diborylated ionic liquid with 1,4-diazabicyclo[2.2.2]octane, for which the charge is borne by the backbone of the macromolecule.

In this second route, the ionic conductive properties are intrinsic to the polymer and are provided by the ionic functions borne by the polymer.

The routes developed above make it possible to produce solid electrolytes, however the ionic conductivities obtained do not attain the desired performance in terms of power.

A third route requiring networks of polymers formed in the presence of a liquid electrolyte is envisaged.

The polymer network traps a large amount of liquid electrolyte thus forming a two-phase network that may resemble a solid.

This development route makes it possible to avoid problems of leakage. Furthermore, the weight fraction of polymer network is low, the electrolyte predominantly consisting of a liquid phase. The large amount of liquid phase enables a significant increase in the ionic conductivity relative to the ionic conductivities obtained by the routes described above.

The gels obtained by creation of weak bonds between the polymer and the liquid phase are known as physical gels. Two procedures exist for synthesizing these physical gels.

A first procedure consists in dissolving a triblock polymer of ABA type in a solvent that is selective for block B, for example. Here are several examples of solutions that can form physical gels according to this method:

poly(styrene-block-ethylene oxide-block-styrene) (SOS) dissolved in 1-butyl-3-methylimidazolium hexafluorophosphate ([BMIM][BF6]), ([BMIM][PF6]) being an ionic liquid that is a solvent for polyethylene oxide, "Yiyong He, Paul G. Boswell, Philippe Bohlmann, and Timothy P. Lodge, *J. Phys. Chem. B*, 111, 4645-4652, (2007)", poly(styrene-block-methyl methacrylate-block-styrene) triblock copolymer dissolved in 1-ethyl-3-methylimidazolium bis(trifluoromethylsulfonyl)imide [EMI][TFSI], "Keun Hyung Lee, Sipei Zhang, Timothy P. Lodge, and C. Daniel Frisbie, *J. Phys. Chem. B*, 115, 3315-3321, (2011)" and "Keun Hyung Lee, Moon Sung Kang, Sipei Zhang, Yuanyan Gu, Timothy P. Lodge, and C. Daniel Frisbie, *Adv. Mater.*, 24, 4457-4462, (2012)".

A second method of preparing the gels consists of the evaporation of a mixture comprising a solvent and a non-solvent in which two polymers having different solubilities are dissolved. The evaporation of the non-solvent creates micropores which, in a second step, are filled with a solution of electrolyte in an organic solvent. Here is an example of a solution that may form a physical gel according to this other method:

polyvinylidene fluoride (PVDF) and polymethyl methacrylate (PMMA) as polymers, dimethylformamide (DMF) as solvent and glycerol as non-solvent, $LiPF_6$ in a mixture of dimethyl carbonate and ethylene carbonate as liquid electrolyte.

Furthermore, by introducing finely divided silica into a solution of sulfuric acid a physical gel is obtained owing to the hydrogen bonds that are created between the silica grains and the sulfuric acid solution, "J. M. Ko, R Y. Song, H. J. Yu, J. W. Yoon, B. G. Min, D. W. Kim, *Electrochimica Acta*, 50, 873-876, (2004).

The so-called "physical" gels are in essence reversible and, consequently, not very stable. Several research routes have made it possible to develop irreversible gels by cross-linking of the polymer network. Here are several examples:

reaction of a polyethylene glycol functionalized by amine groups with a polyethylene glycol terminated by succinimide functions in the presence of an ionic liquid, "Marc A. Klingshirn, Scott K. Spear, Raman Subramanian, John D. Holbrey, Jonathan G. Huddleston, and Robin D. Rogers, *Chem. Mater.* 16, 3091-3097, (2004)", crosslinking of an epoxy resin in the presence of an ionic liquid, "Kozo Matsumoto and Takeshi Endo, *Macromolecules*, 41, 6981-6986, (2008)", crosslinking of a mixture of acrylamide (monofunctional monomer) with N,N'-methylenebisacrylamide (bifunctional monomer) and acrylamide-2-methylpropanesulfonic acid (monofunctional monomer) with aqueous hydrogen peroxide solution in the presence of $LiClO_4$, "B. Ganesh, D. Kalpana, N. G. Renganathan, *Ionics*, 14, 339-343, (2008)", electron beam crosslinking of a mixture of polyoxyethylene and of polyethylene glycol diacrylate (PEGDA) in the presence of an ionic liquid (LITFSI), "R. Uchiyama, K. Kusagawa, K. Hanai, N. Imanishi, A. Hirano, Y. Takeda, *Solid State Ionics* 180, 205-211, (2009)", photochemical crosslinking of 1,6-hexanediol diacrylate (HDDA) in the presence of an ionic liquid dissolved in an oligomer of polyethylene glycol dimethyl ether (PEGDME), "Da Qin, Yiduo Zhang, Shuqing Huang, Yanhong Luo, Dongmei Li, Qingbo Meng, *Electrochimica Acta* 56, 8680-8687, (2011)", crosslinking of a butadiene-acrylonitrile copolymer terminated by amine functions (ATBN) with a polyhedral oligomeric silsesquioxane (POSS) functionalized by epoxycyclohexyl groups, "Ming Li, Wentan Ren, Yong Zhang, Yinxi Zhang, *Journal of Applied Polymer Science*, 126, 273-279, (2012)", Michael addition reaction between a molecule bearing four thiol functions and a mixture of difunctional and trifunctional acrylates, "Devatha P. Nair, Neil B. Cramer, John C. Gaipa, Matthew K. McBride, Emily M. Matherly, Robert R. McLeod, Robin Shandas, and Christopher N. Bowman, *Adv. Funct. Mater.*, 22, 1502-1510, (2012)".

The routes described for obtaining gels by crosslinking organic compounds only permits a limited choice of the organic compounds that can be used. Furthermore, the use of large-sized functionalized polymers prohibits their impregnation in the pores of the carbonaceous materials.

Indeed, as FIG. 3 indicates, the surface of a carbonaceous material 1 comprises macropores 2 having a size of greater than 50 nm, mesopores 3 having a size of between 2 and 50 nm and micropores 4 having sizes of less than 2 nm. It is easily understood that monomers of excessively large size cannot fit into all the pores of the carbonaceous material 1.

The exchanges between the carbonaceous material and the gel formed from large-sized macromolecules are not very good which reduces the specific capacitance of the supercapacitors that use electrodes based on carbonaceous material.

Another route consists in polymerizing a mixture of monofunctional and polyfunctional monomers dissolved in an ionically conductive liquid by thermally-initiated radical polymerization, the polymerization being carried out in situ in the presence of the electrode material. The ionically conductive liquid is possibly an ionic liquid, or an aqueous or organic solvent.

This route has the following advantages:

it makes it possible to obtain a solid electrolyte which does not flow, it enables the use of small-sized precursor monomers enabling their impregnation within the micropores 4 of the carbonaceous material, it enables a better control of the impregnation time, the crosslinking being initiated by heating.

These advantages make it possible to create a good contact between the carbonaceous material and the gel thus making it possible to obtain a specific capacitance of the supercapacitor of the same order of magnitude as that obtained with a liquid electrolyte.

However, it should be noted that the carbonaceous materials prevent the crosslinking of the monomers.

Indeed, certain carbonaceous materials have sites which are free radical traps or, in other words, the carbonaceous materials have sites for capturing free radicals.

The free radicals formed during the initiation of the monomer crosslinking reaction are then fixed or "trapped" on these sites. This fixation of the radicals inhibits the in situ crosslinking reaction of the monomers. It then becomes impossible to form a gel via a thermally-initiated radical route in the presence of a material comprising porous activated carbon.

SUMMARY OF THE INVENTION

The invention therefore proposes to carry out a thermally-initiated crosslinking reaction of a mixture of monomers in situ in the presence of a porous carbonaceous material via a radical route.

According to one aspect of the invention, a process is proposed for producing an electrode-gel electrolyte assembly based on porous carbonaceous material comprising radical-trapping sites comprising:

a step of forming a bond between the radical-trapping sites of the carbonaceous material and functionalizing molecules, a step of preparing a solution comprising at least one monofunctional monomer and at least one polyfunctional monomer, an ionically conductive electrolyte and a radical initiator. The electrolyte may be an aqueous solution of a salt or a solution of an organic salt in an organic solvent, or an ionic liquid, a step of impregnating the solution of said monomers into the pores of the carbonaceous material, and a step of in situ radical polymerization of said monomers.

The sites for trapping or fixing the radicals are masked by the functionalizing molecules. In other words, the trapping sites are rendered inert with respect to the radicals formed during the crosslinking reaction; the carbonaceous material is said to be "passivated".

Advantageously, the functionalizing molecules form a bond with the radical-trapping sites via an azide group or a diazonium salt located on the functionalizing molecules. The functionalizing molecules furthermore comprise groups that make it possible to modify the surface properties of the carbonaceous material, such as oxyethylene groups that improve the interaction between the carbonaceous material and an aqueous electrolyte consisting of the gelled polymer.

The step of forming a bond between the carbonaceous material and the functionalizing molecules via a diazonium salt is carried out at ambient temperature, and comprises the following sub-steps:

reduction of the diazonium salt in the presence of hypophosphorous acid in order to form a free radical, addition of the free radical to the carbonaceous material.

The step of forming a bond between the carbonaceous material and the functionalizing molecules via an azide group is carried out at around 135° C. in an atmosphere comprising an inert gas.

Advantageously, the functionalizing molecule is 1-azido-[2'-(2-methoxyethoxy)-ethyl]ethane. This compound is known for its good wettability properties thus making it possible to improve the interaction between the carbonaceous material and the polymer-electrolyte gel if the latter is aqueous, formed by crosslinking of the monomers, used respectively as electrode and electrolyte for a supercapacitor.

Advantageously, the solution of monomers comprises acrylamide, N,N'-methylenebisacrylamide in the presence of a radical polymerization initiator and an aqueous salt solution, the radical initiator being ammonium persulfate. Advantageously, the initiator may be combined with a radical polymerization co-initiator, such as N,N,N',N'-tetramethylethylenediamine.

According to another aspect of the invention, a supercapacitor comprising an electrode-gel electrolyte assembly produced according to the process described above is proposed.

The "functionalization" or "passivation" of the carbonaceous material consists, within the meaning of the invention, in rendering the free radical-trapping sites inert by combining molecules of low molar masses therewith by formation of a chemical bond. The trapping sites are thus inhibited; they cannot trap the free radicals released during the monomer crosslinking reaction.

It then becomes possible to produce a solid electrolyte in the presence of a porous carbonaceous material having radical-trapping sites thus making it possible to improve the active surface of a supercapacitor comprising an electrode-gel electrolyte assembly produced according to the invention.

BRIEF DESCRIPTION OF THE DRAWINGS

The invention will be better understood and other advantages will appear on reading the following description given by way of example and owing to the appended figures, among which.

DETAILED DESCRIPTION

Figure 1:
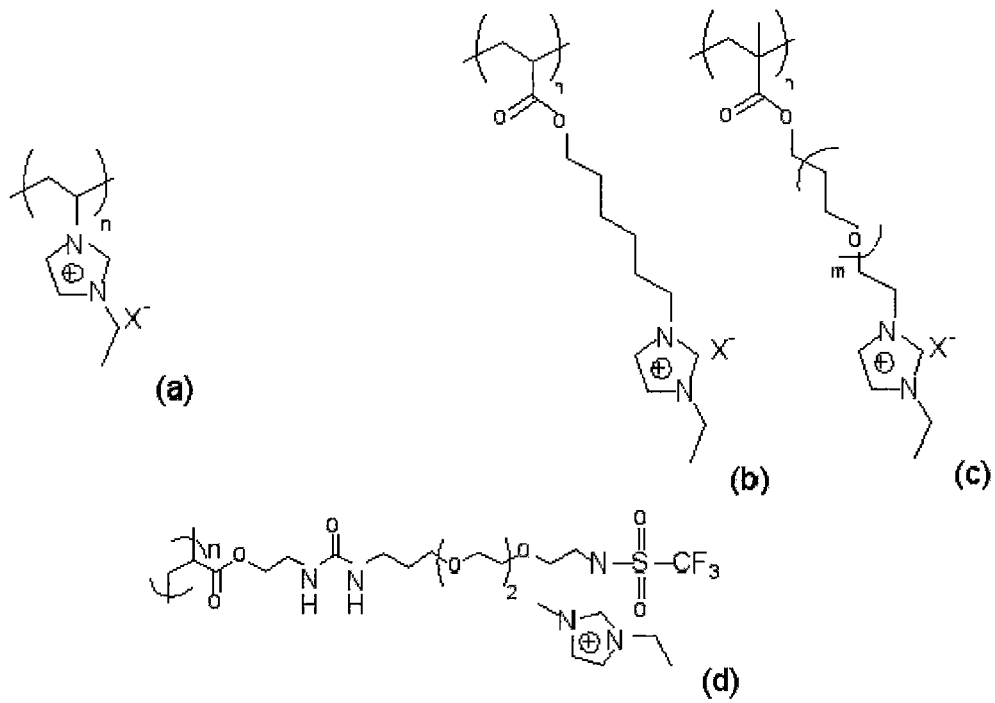
FIGS. 1a, 1b, 1c and 1d, already described, represent polymers used as solid electrolyte, and for which the ionic functions are borne by a side-chain, according to the known art, FIG. 2, already described, represents a polymer used as solid electrolyte for which the ionic function is borne by the main backbone, according to the known art, FIG. 3, already described, schematically represents a carbonaceous material 1 comprising macropores 2, micropores 4 and mesopores 3, according to the known art, FIGS. 4a and 4b respectively represent a diazonium salt and an azide group.
Figure 2:
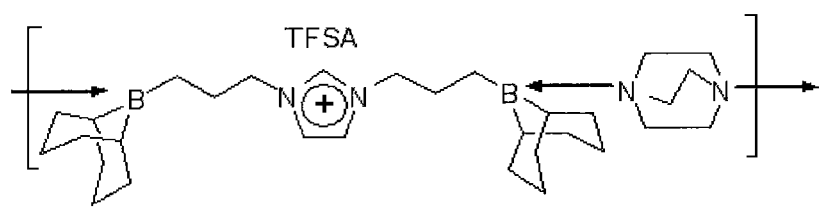
Figure 4:
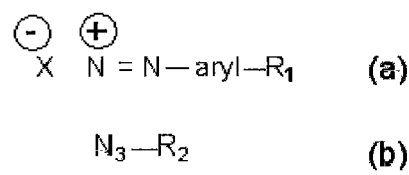
Figure 3:
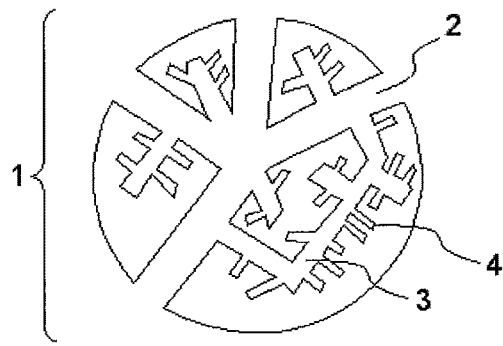

So as to enable the crosslinking of the macromolecules via a radical route in the presence of a carbonaceous material, the free radical-trapping sites are functionalized. The free-radical trapping sites are combined with molecules of low molar masses comprising diazonium salts, as represented in FIG. 4a, or azide groups, as represented in FIG. 4b. The sites then become unavailable for trapping free radicals released during the initiation of the crosslinking reaction of the monofunctional and polyfunctional monomers via a radical route.

Figure 5A:
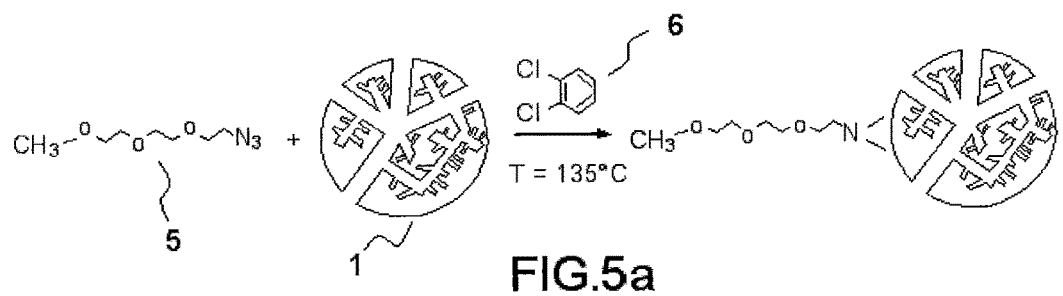
FIG. 5a represents the reaction for forming a chemical bond between a porous carbonaceous material and an azide group, according to one aspect of the invention, FIGS. 5b and 5c respectively represent: the reaction for forming a chemical bond between a carbon nanotube and an azide group and the reaction for forming a chemical bond between a carbon nanotube and a diazonium salt, according to one aspect of the invention.

FIG. 5a represents the reaction for forming a chemical bond between the carbonaceous material and the functionalizing molecules, i.e. reaction for functionalizing the carbonaceous material by molecules of low molar mass. In this particular case, it is the combination of an azide 5 with a material comprising activated carbon 1.

In the example chosen, the azide is 1-azido-[2'-(2"-methoxyethoxy)ethyl]-ethane 5. The functionalizing reaction or reaction for forming the chemical bond is carried out in the presence of 1,2-dichlorobenzene 6 at a temperature of 135° C. in an inert atmosphere.

The product obtained is activated carbon 1 comprising 1-azido-[2'-(2"-methoxyethoxy)ethyl]ethane 5, the azide 5 being bonded to the surface of the activated carbon but also to the surface of the inside of the pores 2, 3, 4 of the activated carbon 1. The low molar mass of the molecules combined with the carbonaceous material 1 enables the functionalization of the inside of the pores of the activated carbon.

Figure 5B:
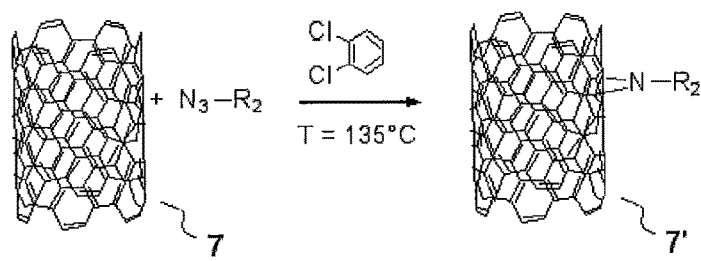
Figure 5C:
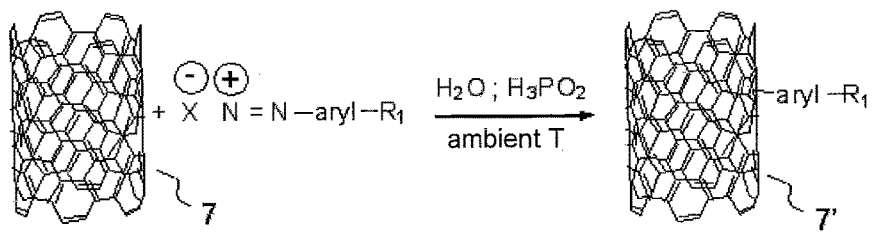

FIGS. 5b and 5c respectively represent:

the reaction for forming a bond between the carbon nanotubes 7 and a functionalizing molecule comprising an azide group, the reaction being carried out in the presence of dichlorobenzene and at a temperature substantially equal to 135° C. under an inert atmosphere, and the reaction for forming a bond between the carbon nanotubes 7 and a functionalizing molecule comprising a diazonium salt, the reaction being carried out in the presence of hypophosphorous acid at ambient temperature.

Example of a Procedure: Functionalization of a Sample of Activated Carbon by 1-azido-[2'-(2"-methoxy)ethyl]ethane The activated carbon is produced from carbon-rich plant organic matter and is characterized by a porous structure inside which micropores 4, mesopores 3 and macropores 2 coexist, the specific surface area of this type of material possibly reaching 3000 m$^2$/g.

In a first step, the molecule to be grafted is synthesized; in this particular case the molecule is 1-azido-[2'-(2"-methoxy)ethyl]ethane 5. Alternatively, other molecules may be chosen, such as 1-azidoalkanes, substituted azidobenzenes and ionic liquids functionalized by an azide function.

The procedure for the synthesis of 1-azido-[2'-(2"-methoxy)ethyl]ethane is described hereinbelow.

Figure 6:
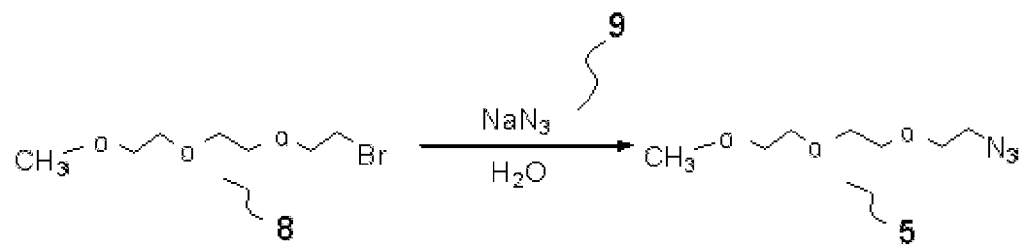
FIG. 6 represents the reaction for preparing a molecule 5 comprising an azide group.

1-Azido-[2'-(2"-methoxy)ethyl]ethane 5 is obtained in one step from 1-bromo-[2'-(2"-methoxyethoxy)ethyl]ethane 8 by nucleophilic substitution of the bromine atom by sodium azide 9, this reaction being represented in FIG. 6 according to the experimental protocol described hereinbelow.

Dissolved in a 100 ml round-bottomed flask are 1.96 g, i.e. 8.63 mmol, of 1-bromo-[2'-2"-methoxyethoxy)ethyl] ethane 8 in a solution of 2.07 g, i.e. 31.84 mmol, of sodium azide 9 in 24 ml of water. The mixture is heated under reflux for 21 h. The reaction medium is left to return to ambient temperature and is extracted 5 times with dichloromethane. The organic phases are combined together, dried over magnesium sulfate and evaporated to dryness with a rotary evaporator. 1.47 g of azide 5 are obtained in the form of a colorless liquid. The yield is 90%.

In a second step, the 1-azido-[2'-(2"-methoxy)ethyl]ethane 5 is grafted to activated carbon 1 of HDLC30 type, that is to say that a chemical bond is created between the porous activated carbon 1 and the 1-azido-[2'-(2"-methoxy)ethyl] ethane 5, according to the procedure described hereinbelow.

80 mg of HDLC30 activated carbon 1 are dispersed in 70 ml of 1,2-dichlorobenzene via a 3 h ultrasound treatment. The dispersion of activated carbon 1 thus obtained is introduced into a 250 ml three-necked round-bottomed flask.

Under an argon purge, a solution of 210 mg of azide 5 dissolved in 1 ml of 1,2-dichlorobenzene is added dropwise. The reaction medium is heated at 135° C. under argon for 24 h.

A black solid is separated by filtration on a Sartorius Stedim (PTFE, 0.45 μm) filter, washed with chloroform, then with acetone and with diethyl ether. Finally, the solid is dried under vacuum at 50° C. 75.3 mg of activated carbon bonded to 1-azido-[2'-(2"-methoxy)ethyl]ethane 5 are obtained.

This reaction makes it possible to render the radical-trapping sites inert, or in other words to passivate the activated carbon 1.

So as to demonstrate the inhibition of the free radical-trapping sites and thus to show the feasibility of the in situ gelling of a gel polymer electrolyte in the presence of a carbon-based material, a test is carried out: 230 mg of activated carbon 1 modified by the azide 5 are suspended in a solution S which, after radical crosslinking, results in a polymer electrolyte that forms a gel based on 3M lithium nitrate. This solution S is composed of:

100 mg of acrylamide, which is a monofunctional monomer, 10 mg of N,N'-methylenebisacrylamide, which is a difunctional monomer, 5 mg of ammonium persulfate, which is a radical initiator, 414 g of lithium nitrate acting as electrolyte, and 2 ml of water.

The addition of a drop of N,N,N',N'-tetramethylethylenediamine, which is a co-initiator of the radical polymerization, to the solution S above, leads in a few seconds to the formation of a gel.

Figure 7:
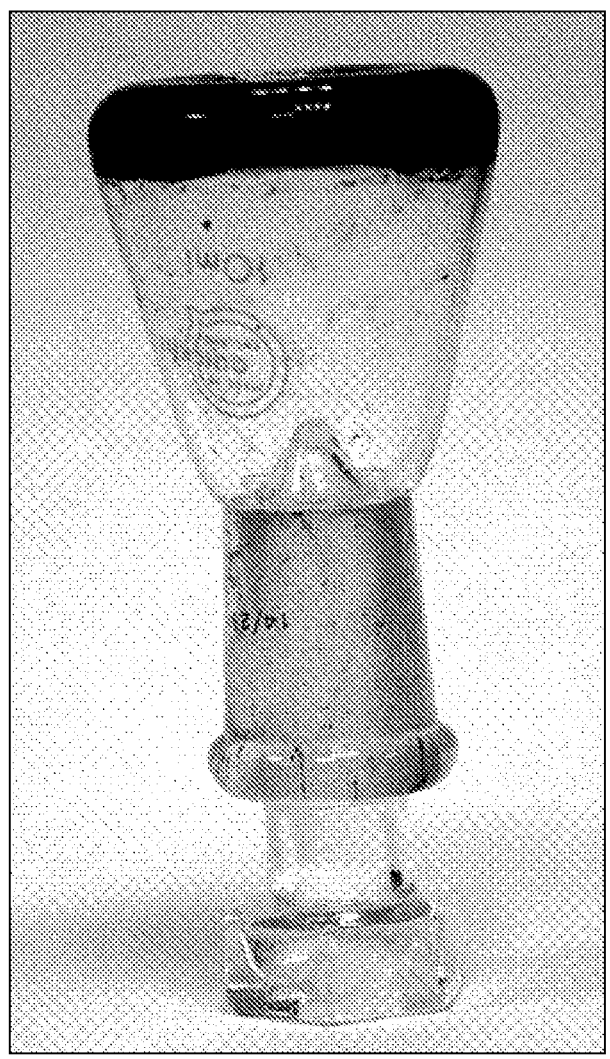
FIG. 7 represents an Erlenmeyer flask held upside down and comprising a solid polymer electrolyte gel in the presence of activated carbon, according to one aspect of the invention.

FIG. 7 is a photo of a gel polymer electrolyte formed in the presence of the carbonaceous material according to the invention.

This test clearly shows that the trapping sites are rendered inert; they no longer trap the radicals formed during the monomer crosslinking reaction.

The photo of FIG. 7 represents the gel polymer electrolyte crosslinked in situ via a radical route in the presence of a carbonaceous material comprising pores and radical-trapping sites. The Erlenmeyer flask in which the electrode-gel electrolyte assembly according to the invention is contained is completely upturned, the assembly formed does not flow which shows that the gel polymer is completely crosslinked, and all of the ionically conductive solution, in this particular case lithium nitrate, is trapped inside the crosslinked polymers.

Example of a Procedure: Functionalization of a Multi-Sheet Carbon Nanotube Sample by 1-azido-[2'-(2"-methoxy)ethyl]ethane In a first step, the molecule is synthesized, in this particular case the molecule to be grafted is 1-azido-[2'-(2"-methoxy)ethyl]ethane 5, as above.

In a second step, the 1-azido-[2'-(2"-methoxy)ethyl]ethane 5 is grafted to the carbon nanotubes 7, according to the procedure described hereinbelow.

240 mg of multi-sheet nanotubes (Aldrich) are dispersed in 210 ml of 1,2-dichlorobenzene via a 3 h ultrasound treatment.

The dispersion of carbon nanotubes 7 thus obtained is introduced into a 500 ml three-necked round-bottomed flask. A solution of 630 mg of azide (3.33 mmol) in 5 ml of 1,2-dichlorobenzene is added dropwise to the dispersion of carbon nanotubes under a stream of argon. The reaction medium is heated at 135° C. under argon for 24 h.

A black solid is separated by centrifugation (3000 rpm) and washed twice with tetrahydrofuran. The solid is isolated by filtration on a Sartorius (PTFE, 0.45 μm) filter, washed with acetone then with diethyl ether and dried under vacuum at 50° C. for 36 h, then at 80° C. for 3 h. 0.285 mg of carbon nanotubes 7' chemically modified by the azide 5 is obtained.

Preparation of a Buckypaper Electrode from Carbon Nanotubes Chemically Modified by 1-azido-[2' (2"-methoxy)ethyl]ethane 30 mg of carbon nanotubes 7' chemically modified by molecules of 1-azido-[2'(2"-methoxy)ethyl]ethane 5 type are dissolved in 90 ml of N-methyl-2-pyrrolidone (NMP) by placing the mixture in an ultrasound bath for 3 hours. In order to eliminate the particles in suspension, the dispersion is centrifuged (3000 rpm). The dispersion is then filtered on a Whatman "Anodisc 25" alumina filter having a porosity of 0.2 μm. The buckypaper formed on the filter is washed with acetone and with diethyl ether. Finally, it is dried under vacuum at 50° C. An electrode having a diameter of 17 mm is obtained. Two electrodes are thus prepared.

Production and Characterization of the Supercapacitor

The "buckypapers" obtained above are cut using a punch in order to form electrodes having a diameter of 16 mm. A separator is positioned between the two electrodes; the separator is a cellulose-based disk.

The assembly is impregnated with a solution S comprising the monofunctional and polyfunctional monomers, the radical initiator and the ionically conductive electrolyte. The supercapacitor is then heated for 12 h in order to enable the formation of the gel.

The specific capacitance of a supercapacitor comprising gold collectors, when a current of 10 mA is applied, is 6 $F \cdot g^{-1}$ with a series resistance of 2.75 ohms. This capacitance is of the same order of magnitude as that obtained with a liquid electrolyte and greater than that obtained with a solid electrolyte produced according to the synthesis routes proposed in the literature.

The invention claimed is:

1. A process for producing a supercapacitor comprising:
    a step of rendering inert a plurality of radical-trapping sites on a carbonaceous material by forming chemical bonds with functionalized molecules, oligomers or polymers;
    a step of generating a pair of porous carbonaceous material electrodes;
    a step of positioning a separator between the electrodes;
    a step of preparing a solution comprising at least one monofunctional monomer and at least one polyfunctional monomer, an ionically conductive electrolyte and a radical initiator;
    a step of impregnating the solution of said monomers into pores of the carbonaceous material; and
    a step of in situ radical polymerization of said monomers.

2. The process of claim 1, wherein the functionalizing molecules form a bond with the radical-trapping sites via an azide group or a diazonium salt.

3. The process of claim 1, wherein the step of rendering inert a plurality of radical-trapping sites on a carbonaceous material by forming chemical bonds with functionalized molecules, oligomers or polymers is carried out using a diazonium salt at ambient temperature, and comprises the following sub-steps:
    reduction of the diazonium salt in the presence of hypophosphorous acid in order to form a free radical; and
    addition of the free radical to the carbonaceous material.

4. The process of claim 1, wherein the step of rendering inert a plurality of radical-trapping sites on a carbonaceous material by forming chemical bonds with functionalized molecules, oligomers or polymers is carried out using an azide group at around 135° C. in an atmosphere comprising an inert gas.

5. The process of claim 3, wherein the functionalizing molecule is 1-azido-[2'-(2-methoxyethoxy)ethyl]ethane.

6. The process of claim 1, wherein the solution of monomers comprises acrylamide, N,N'-methylenebisacrylamide in presence of a radical polymerization initiator and an ionic liquid.

7. The process of claim 5, wherein the radical initiator is ammonium persulfate.

8. The process of claim 1, wherein the solution of monomers also comprises a radical polymerization co-initiator, the radical polymerization co-initiator being N,N,N',N'-tetramethylethylenediamine.

* * * * *